United States Patent

[11] 3,624,431

[72] Inventors Jitsuro Machida
Sawa-gun;
Takashi Tanaka, Takasaki-shi, both of Japan
[21] Appl. No. 840,945
[22] Filed July 11, 1969
[45] Patented Nov. 30, 1971
[73] Assignee Taiyo Yuden Kabushiki Kaisha
Tokyo, Japan
[32] Priority July 12, 1968
[33] Japan
[31] 43/48417

[54] COMPOSITE CIRCUIT MEMBER INCLUDING AN ELECTROSTRICTIVE ELEMENT AND CONDENSER
8 Claims, 10 Drawing Figs.

[52] U.S. Cl. .......... 310/9.5, 310/8.1, 310/8.2, 310/9.8, 333/72
[51] Int. Cl. .......... H01v 7/00
[50] Field of Search .......... 310/8.2, 9.8, 9.5, 8, 8.1; 333/72; 317/101 A

[56] References Cited
UNITED STATES PATENTS

| | | | |
|---|---|---|---|
| 2,483,677 | 10/1944 | Swinehart | 310/8.9 |
| 2,486,150 | 10/1949 | Gravley | 310/8.9 |
| 3,365,591 | 1/1968 | Koneval et al. | 310/8.2 |
| 3,382,381 | 5/1968 | Horton | 310/8.2 |
| 3,401,275 | 9/1968 | Curran et al. | 310/8.2 |
| 3,416,036 | 12/1968 | Ho | 333/72 X |
| 3,487,318 | 12/1969 | Herman | 310/8.2 X |
| 3,490,055 | 1/1970 | Cox | 317/101 X |
| 3,222,622 | 12/1965 | Curran et al. | 310/9.8 X |
| 3,401,276 | 9/1968 | Curran et al. | 310/9.8 X |
| 3,167,668 | 1/1965 | Nesh | 310/9.8 X |

FOREIGN PATENTS

| | | | |
|---|---|---|---|
| 1,027,735 | 4/1958 | Germany | 310/8.2 |

*Primary Examiner*—D. F. Duggan
*Assistant Examiner*—Mark O. Budd
*Attorney*—Waters, Roditi, Schwartz and Nissen

ABSTRACT: A composite circuit member is formed of a base plate of an electrostrictive material. Control elements for the electrostrictive operation are located on opposite surfaces of the base plate. Electrodes of a condenser are also mounted thereon. To control the frequency response characteristics of the condenser, the electrodes are covered with a coating of a high-polymer resin such as epoxy resin.

PATENTED NOV 30 1971 3,624,431

INVENTOR

BY Jitsuro Machida
Takashi Tanaka

COMPOSITE CIRCUIT MEMBER INCLUDING AN ELECTROSTRICTIVE ELEMENT AND CONDENSER

SUMMARY OF INVENTION

To achieve the objects of the invention as set forth hereinunder, there is provided a circuit element comprising an electrostrictive baseplate with condenser electrodes mounted thereon in spaced relation with a resin coating covering the electrodes. The coating is substantially limited to the electrodes formed alone and of the base and can be an insulating high-polymer resin. The aforesaid plate is generally flat and is adapted for thickness-direction oscillation. Electrostrictive control elements are mounted in opposed relationship on opposite surfaces or sides of the plate.

The frequency response characteristics of a condenser which includes selectrodes mounted on an electro-strictive plate, are improved in accordance with the present invention by covering the electrodes with an insulating coating.

BRIEF DESCRIPTION OF THE DRAWING

FIG. 10. is a discriminator circuit using an electrostrictive element of the present invention.

DETAILED DESCRIPTION

This invention relates to a composite circuit member incorporating an electrostrictive element utilizing the thickness-direction oscillation of a ceramic plate of electrostrictive material and a condenser.

The invention has as an object the provision of a composite circuit member of the above-noted type having high quality and being of low cost and small size.

According to the invention, there is provided a composite circuit member comprising an electrostrictive element wherein electrodes are provided generally on opposite surfaces at the central portion of a ceramic electrostrictive base plate adapted for thickness-direction oscillation. Additionally, a condenser is formed by opposite or parallel electrodes provided at an end edge portion of the base plate. The condenser portion is coated with an insulating high-polymer resin.

Figure 8:
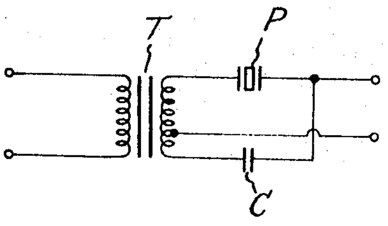
FIG. 8 is a 9 circuit diagram using an electrostrictive element of the present invention.
Figure 9:
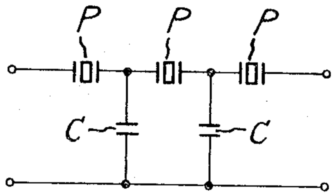

In an electric circuit utilizing the electromechanical transducing effect of an electrostrictive material, it is common that the same be used together with a condenser. Frequently in such cases the condenser is separate from the electrostrictive element. FIGS. 8 and 9 are examples of such a circuit and show, respectively, a Yaman-type filter circuit and a ladder-type filter circuit. In these circuits P is the electrostrictive element, C is a condenser and T is the transformer (not used in FIG. 9).

The prior art is replete with composite members incorporating circuit elements such as a resistor, a condenser or the like formed on a ceramic dielectric material functioning as a baseplate. It has been found impossible, however, to obtain a condenser with ideal electric-characteristic features. This is due to the fact that, since the electrostrictive baseplate utilizes its mechanical oscillation at the predetermined frequency and if electrodes are formed on the baseplate to form a condenser, the condenser does not have an impedance in proportion to these frequencies and instead has an irregular impedance value near the resonance frequency of the electrostrictive material. Thus, it is not possible to use the same as an accurate condenser for an electronic circuit.

According to a feature of the invention, a condenser formed at the end edge portion of a ceramic electrostrictive baseplate characterized by thickness-direction oscillation is coated with an insulating high-polymer resin.

Figure 7:
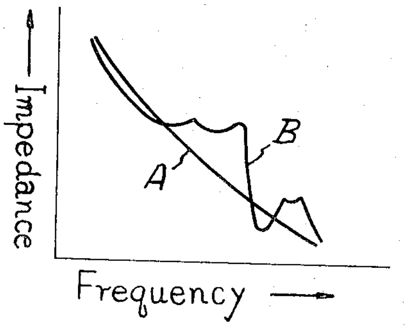
FIG. 7 is a view showing an electric characteristic of a condenser formed in accordance with the principles of the invention.

When condensers which respectively are and are not provided with such an insulating coating as taught by the present invention are compared as to their electrical characteristics, the impedance of the conventional condenser is irregular as shown by curve B in FIG. 7, whereas the formed in accordance with the principles of the present invention has characteristics varying regularly in proportion to the applied frequencies as shown by curve A.

Additionally, the electrostrictive characteristics of the element of the invention are not at all affected by the aforenoted coating since the electrostrictive element utilizes only the thickness-direction oscillation of the baseplate.

Examples of the invention will next be explained with reference to the accompanying drawings.

Figure 1:
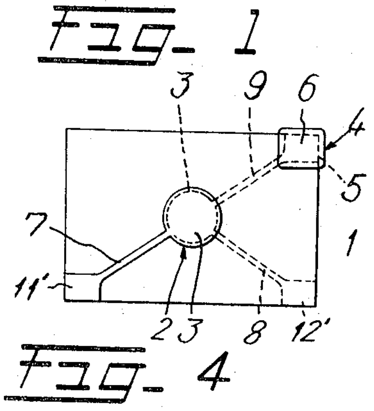
FIG. 1 is a top plan view of one embodiment of the invention.
Figure 2:
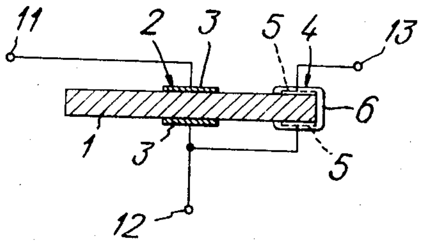
FIG. 2 is a schematic sectional view of the same illustrating the electric connection thereof.

In FIG. 1 and 2, numeral 1 denotes an electrostrictive baseplate or member characterized by a thickness-direction oscillation properly. A fresh pair of electrodes or control electrodes 3 are provided generally at the center portion of the opposite surfaces of the baseplate 1 and form an electrostrictive element 2.

A second pair of electrodes 5 are provided on opposite surfaces at the end edge portion of the baseplate 1 to form a condenser element 4. A coating 6 of an insulating high-polymer resin such as epoxy resin is applied to surround or enclose the condenser element 4 only.

Numerals 7, 8 and 9 identify conductive portions or leads, and numerals 11′ and 12′ identify electrodes constituting connecting terminals. One electrode 5 of the condenser 4 serves also as a connecting terminal.

In FIG. 2, numerals 11, 12 and 13 denote terminals connected to respective terminal connecting electrodes 11′and 12′ and 5.

Figure 3:
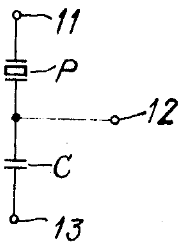
FIG. 3 is an equivalent circuit diagram of the same.

FIG. 3 shows an equivalent circuit corresponding to the element of FIGS. 1 and 2. P denotes the electrostrictive element and C is the condenser.

Figure 4:
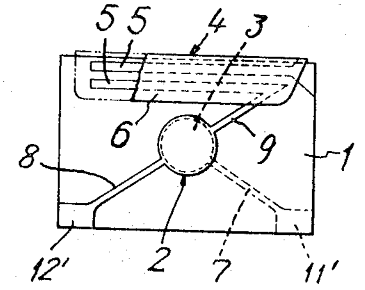
FIG. 4 is a top plan view of another embodiment of the invention.
Figures 5, 6:
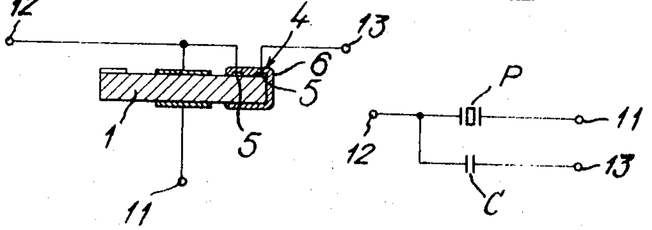
FIG. 5 is a schematic sectional view of the same illustrating the electric connection thereof.
FIG. 6 is an equivalent circuit diagram of the same.

The example shown in FIGS. 4 and 5 is such that the second pair of electrodes 5 are provided in parallel with one another on one side surface of the end edge portion of a ceramic electrostrictive baseplate 1 to form a condenser element 4. This element 4 is coated with a layer 6 of an insulating high-polymer resin such as, for instance, epoxy resin. FIG. 6 shows an equivalent circuit thereof.

In the above examples, a single electrostrictive element and a single condenser are combined together on a single baseplate. It is of course possible to incorporate a plurality of condensers.

Figure 10:
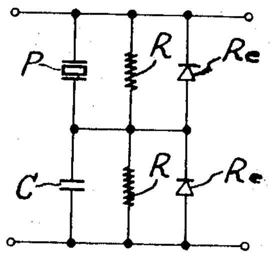
FIG. 10 is a ladder circuit diagram using an electrostrictive element of the present invention.

The circuit member of this invention can be used in filter circuits as shown in FIGS. 8 and 9 or in discriminator circuits as shown in FIG. 10.

The purpose of the coating described above resides at least partly in the fact that the mechanical oscillation at the condenser portion is absorbed in the coating, and the oscillation frequency at the portion is changed to a value lower than the frequency inherent in the electrostrictive plate so as to avoid its influencing the characteristic feature near the resonant frequency of the electrostrictive plate. Additionally, the coating serves to present a large load to the oscillation for weakening the oscillation energy.

What is claimed is:

1. A composite circuit element comprising a base member of an electrostrictive material, said base member having two opposite surfaces and an end edge portion, a first pair of electrodes, each of said first pair of electrodes being attached to a respective surface of said two opposite surfaces in a central region of said base member, a second pair of electrodes, each of said second pair of electrodes being attached to said end edge portion a coating of insulating high-polymer material, said second pair of electrodes and said end edge portion being coated with said coating and forming an electric condenser of said second pair of coated electrodes.

2. An element as claimed in claim 1 wherein the second pair of electrodes are on opposite surfaces of the base member.

3. An element as claimed in claim 1 wherein the condenser electrodes are on the same side of the plate.

4. An element as claimed in claim 1 including conductors on the base member connecting the condenser and said first pair of electrodes.

5. A method of improving frequency response characteristics of a condenser formed by electrodes mounted on an electrostrictive plate comprising placing said electrodes on an end edge 6. A method as claimed in claim 5 wherein the electrodes are coated with said insulating coating.

7. A method as claimed in claim 5 wherein the coating is a high-polymer resin.

8. A method as claimed in claim 5 wherein the resin is epoxy resin.

* * * * *